(12) United States Patent
Neff

(10) Patent No.: US 6,933,862 B2
(45) Date of Patent: Aug. 23, 2005

(54) POWER CONSUMPTION STABILIZATION SYSTEM AND METHOD

(75) Inventor: Robert M. R. Neff, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/684,992

(22) Filed: Oct. 14, 2003

(65) Prior Publication Data

US 2005/0078016 A1 Apr. 14, 2005

(51) Int. Cl.[7] .......................... H03M 7/00; H03K 17/16
(52) U.S. Cl. .......................................... 341/50; 326/26
(58) Field of Search ............................... 341/50; 326/8, 326/26, 33, 136

(56) References Cited

U.S. PATENT DOCUMENTS

| | | | |
|---|---|---|---|
| 3,784,743 A * | 1/1974 | Schroeder | 380/46 |
| 5,241,602 A * | 8/1993 | Lee et al. | 380/268 |
| 5,530,959 A * | 6/1996 | Amrany | 380/268 |
| 5,793,318 A | 8/1998 | Jewett | |
| 6,052,390 A * | 4/2000 | Deliot et al. | 370/528 |
| 6,163,284 A * | 12/2000 | Munakata | 341/68 |
| 6,304,482 B1 * | 10/2001 | Lin et al. | 365/154 |
| 2003/0125015 A1 * | 7/2003 | Inoue et al. | 455/411 |

* cited by examiner

Primary Examiner—Howard L. Williams

(57) ABSTRACT

A source signal is provided. The source signal is XORed with a scrambling random signal to generate a scrambled signal. The scrambled signal is transmitted through the digital logic circuit. The scrambled signal is XORed with the descrambling random signal logically identical to the scrambling random signal to produce a descrambled signal identical to the source signal. In one embodiment, the scrambling random signal is transmitted through the digital logic circuit and used as the descrambling random signal. In another embodiment, the scrambling random signal and descrambling random signal are generated independently using pseudo-random number generators. In yet another embodiment, the scrambling random signal is self-synchronizing and is contained within the pattern of the scrambled signal.

4 Claims, 5 Drawing Sheets

POWER CONSUMPTION STABILIZATION SYSTEM AND METHOD

TECHNICAL FIELD

The technical field of this disclosure is digital logic circuits, particularly digital logic circuits having a power consumption stabilization system and methods of stabilizing power consumption.

BACKGROUND OF THE INVENTION

Power consumption in many digital logic circuits is a function of the number of signal level changes occurring in the circuit. There is low power consumption when signal levels are constant and high power consumption when the signal levels change often. For example, transmitting the sequence 10101010 requires twice the power of 10001000 and four times the power of 00001000 for a circuit where the power consumption is dependent on the frequency of transition.

In large digital chips, logic circuits may be classified as control or data flow circuits. Control circuits determine where data goes or what operation will occur. Data flow circuits handle the actual information being processed, such as implementing arithmetic operations. Data flow circuits also pass data through the circuits from one location to another, such as from a register file to a memory unit. Data flow circuit power consumption depends on the number of transitions in the data as it propagates along the data path. The power consumption of a data flow circuit can swing from near zero consumption for a bit stream with a single value to maximum consumption for a bit stream with alternating values. Power consumption in control circuits can also be subject to peaking power consumption. For example, if an address counter has a large load, it will have high power consumption at certain control code changes such as from an all 1 code to an all 0 code. Power supplies and chip cooling must be designed for maximum power consumption. This increases chip size, complexity, and cost. Current techniques for stabilizing power consumption focus on managing power consumption through the design of the particular integrated circuit family. Such measures for mitigating power consumption can limit the design and layout of components in integrated circuits as well as increasing integrated circuit complexity.

It would be desirable to have a digital logic circuit having a power consumption stabilization system that would overcome the above disadvantages.

SUMMARY OF THE INVENTION

The present invention reduces the maximum power consumption for any digital circuit in which power consumption depends on data activity. Signals are scrambled and randomized before entering the digital circuit and unscrambled on exiting. Peak power consumption is reduced because the scrambled signal passing through the digital circuit is random. The scrambled signal will rarely be a continuing series of 10101010 transitions, which would consume the greatest amount of power. These improvements are achieved without limiting the design and layout of components or increasing integrated circuit complexity.

One aspect of the present invention provides a method for stabilizing power consumption in a digital logic circuit. A source signal is provided. The source signal is exclusive ORed with a scrambling random signal to generate a scrambled signal. The scrambled signal is transmitted through the digital logic circuit. The scrambled signal is exclusive ORed with a descrambling random signal logically identical to the scrambling random signal to produce a descrambled signal identical to the source signal.

Another aspect of the present invention provides a system for stabilizing power consumption in a digital logic circuit. The system comprises a first exclusive OR (XOR) gate connected to receive a source signal and a scrambling random signal. The first XOR gate generates a scrambled signal, which is transmitted through the digital logic circuit. A second XOR gate is connected to receive the scrambled signal from the digital logic circuit and a descrambling random signal logically identical to the scrambling random signal, and generates a descrambled signal.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

FIGS. 1–4 show block diagrams for power consumption stabilization systems for digital logic circuits. Generally, a first exclusive OR (XOR) gate receives a source signal and a scrambling random signal, and generates a scrambled signal. The scrambled signal is transmitted through a digital logic circuit, which has power consumption dependent on the number of transitions in a signal. The peak power consumption in the digital logic circuit is reduced because the scrambled signal has been randomized, so that the scrambled signal will rarely contain lengthy strings of alternating bits. For example, the scrambled signal is typically a random string such as 01110100, instead of a string of alternating ones and zeroes, such as 01010101. After the digital logic circuit, a second XOR gate receives the scrambled signal and a descrambling random signal, and generates unscrambled data. The descrambling random signal is logically identical to and has the same bit sequence as the scrambling random signal. The descrambled signal is identical to the source signal.

Figure 1:
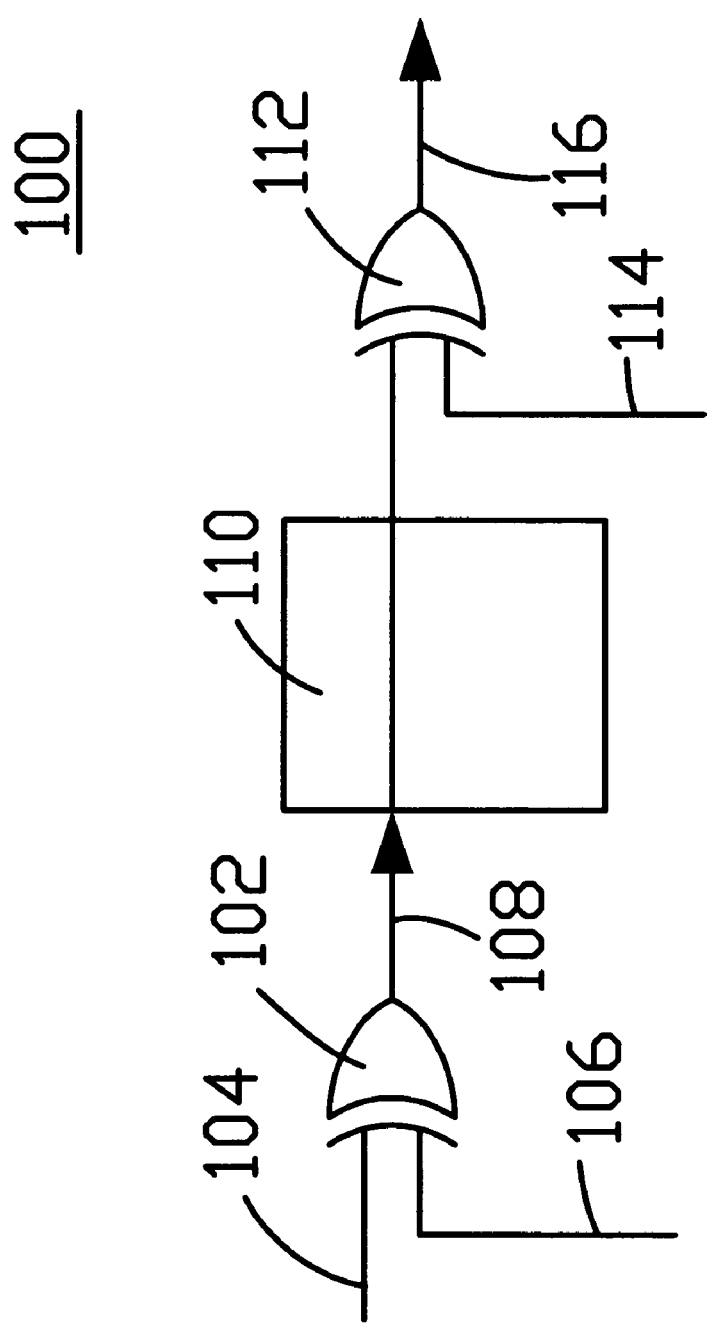
FIGS. 1–4 show block diagrams for power consumption stabilization systems for digital logic circuits according to the present invention.

Referring to FIG. 1, the power consumption stabilization system 100 includes a first exclusive OR (XOR) gate 102 and second XOR gate 112. The first exclusive OR (XOR) gate 102 receives a source signal 104 and a scrambling random signal 106, and XORs them to generate a scrambled signal 108. The scrambled signal 108 is transmitted through the digital logic circuit 110 to the second XOR gate 112. The second XOR gate 112 XORs the scrambled signal 108 with a descrambling random signal 114 logically identical to the scrambling random signal 106 to generate a descrambled signal 116 identical to the source signal 104.

The source signal 104 can be any digital signal, such as a data signal or control signal. The source signal 104 can be a parallel stream of N data paths, with N being greater than or equal to one. A separate XOR gate is provided for each of the data paths, although the same scrambling random signal 106 can be used with all of the data paths. The XOR gates 102, 112 generate a logic one if either, but not both, input is logic one. The XOR gates 102, 112 can comprise any combination of logic gates connected to produce the same logic operation. XOR gates include exclusive NOR (XNOR) gates.

The scrambling random signal 106 and descrambling random signal 114 are each any random or pseudo-random digital sequence. The random signals 106, 114 can be generated by a true random number generator, such as a random number generator using a random physical process, or by a pseudo-random number generator. The scrambling random signal 106 is used at the first XOR gate 102 to scramble the source signal 104. The descrambling random signal 114 logically identical to the scrambling random signal 106 is used at the second XOR gate 112 to unscramble the scrambled signal 108. Timing of the descrambling random signal 114 is coordinated with that of the scrambled signal 108 so that the same bit value of the scrambling random signal 106 that was used to scramble a bit of the source signal 104 appears in the descrambling random signal 114 and is used to unscramble the corresponding bit of the scrambled signal 108. The descrambling random signal 114 can be the same signal as the scrambling random signal 106, a reconstructed random signal, or an archived random signal.

Figure 2:
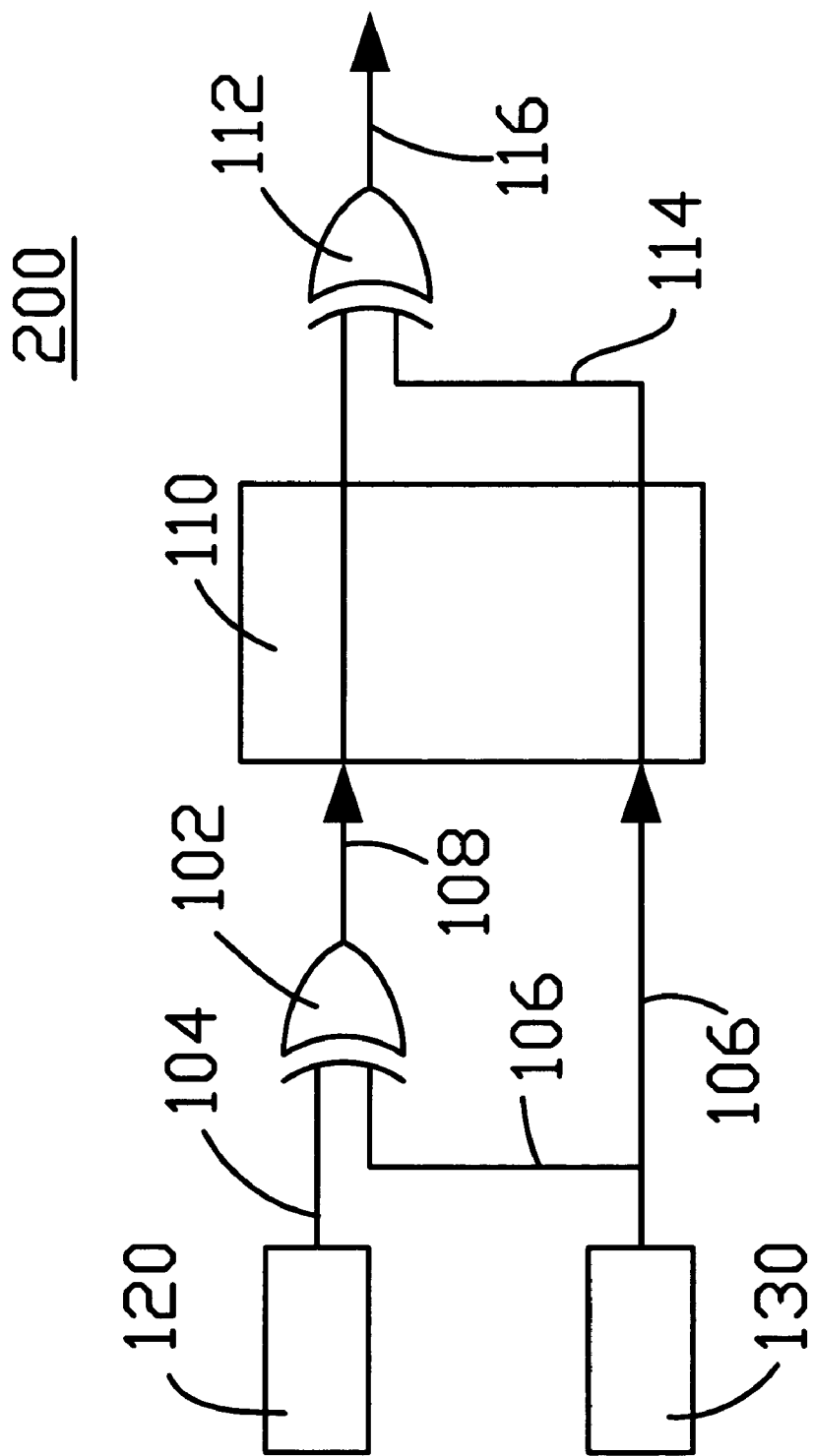

FIG. 2, in which like elements share like reference numbers with FIG. 1, shows a block diagram for a power consumption stabilization system for digital logic circuits. In the power consumption stabilization system 200, the scrambling random signal is transmitted with the scrambled data and used as the descrambling random signal.

A signal source 120 provides a source signal 104 to a first XOR gate 102. The source signal 104 can be any digital signal, such as a data signal or control signal. A random number generator 130 provides a scrambling random signal 106 to the first XOR gate 102. The random number generator 130 is any circuit generating a random or pseudo-random digital sequence. The source signal 104 and scrambling random signal 106 are processed by the first XOR gate 102 to generate scrambled signal 108. The scrambled signal 108 and the scrambling random signal 106 are transmitted through the digital logic circuit 110. The power consumption of the digital logic circuit 110 is a function of the number of transitions in the signal passing through the digital logic circuit 110, so the scrambled signal 108 reduces the peak power consumption over a signal with repeated transitions. In one embodiment, the scrambling random signal 106 passes through the digital logic circuit 110 separately from the scrambled signal 108. In another embodiment, the scrambling random signal 106 is included as part of the scrambled signal 108. In yet another embodiment, the scrambling random signal 106 bypasses the digital logic circuit 110.

The scrambling random signal 106 is provided to a second XOR gate 112 as the descrambling random signal 114. The scrambled signal 108 from the digital logic circuit 110 is also provided to the second XOR gate 112. The descrambling random signal 114 is coordinated with the scrambled signal 108 so that the same bit value of the scrambling random signal 106 that was used to scramble a bit of the source signal 104 is used to unscramble the corresponding bit of the scrambled signal 108. The scrambled signal 108 and the descrambling random signal 114 are processed by the second XOR gate 112 to generate descrambled signal 116. The descrambled signal 116 is identical to the source signal 104.

In another embodiment in which the digital circuit stores and retrieves the source signal, the scrambling random signal 106 can be stored and retrieved later along with the retrieved source signal. The scrambling random signal 106 that is gated with the source signal 104 at the first XOR gate 102 is stored. The scrambling random signal 106 can be stored in any data storage medium, such as solid-state, magnetic, or optical media. When the scrambled signal 108 is retrieved, the scrambling random signal 106 is retrieved as descrambling random signal 114 and provided at the second XOR gate 112 to descramble the scrambled signal 108 to generate the descrambled signal 116. The descrambling random signal 114 can also function as a key, since someone receiving the scrambled signal 108 cannot unscramble it without the descrambling random signal 114.

Figure 3:
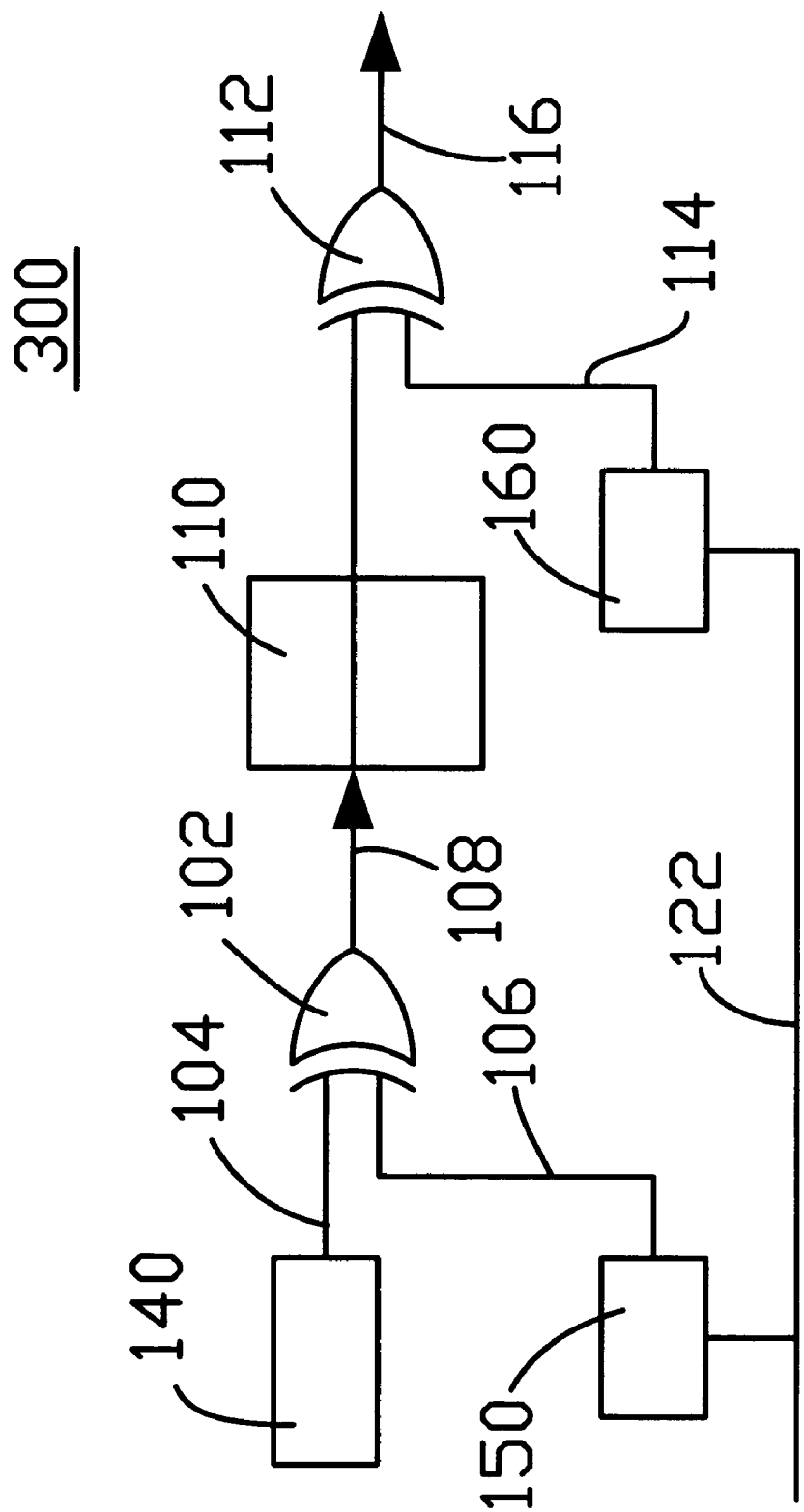

FIG. 3, in which like elements share like reference numbers with FIG. 1, shows a block diagram for a power consumption stabilization system for digital logic circuits. In the power consumption stabilization system 300, the descrambling random signal is re-generated for use in unscrambling the scrambled signal.

A signal source 140 provides a source signal 104 to a first XOR gate 102. The source signal 104 can be any digital signal, such as a data signal or control signal. A first random number generator 150 provides a scrambling random signal 106 to the first XOR gate 102. The random number generator 150 is any circuit generating a repeatable pseudo-random digital sequence, the digital sequence being initiated by a reset signal 122. The source signal 104 and the scrambling random signal 106 are XORed by the first XOR gate 102 to generate scrambled signal 108. The scrambled signal 108 is transmitted through the digital logic circuit 110. The power consumption of the digital logic circuit 110 is a function of the number of transitions in the signal passing through the digital logic circuit 110.

A second random number generator 160 generates a descrambling random signal 114, the digital sequence being initiated by a reset signal 122. The descrambling random signal 114 at the second XOR gate 112 is logically identical to the scrambling random signal 106 used to generate the scrambled signal 108 at the first XOR gate 102. The scrambled signal 108 and the descrambling random signal 114 are provided to a second XOR gate 112. Timing of the descrambling random signal 114 is coordinated with the scrambled signal 108 so that the same bit value of the scrambling random signal 106 that was used to scramble a bit of the source signal 104 is used to unscramble the corresponding bit of the scrambled signal 108. The scrambled signal 108 and the descrambling random signal 114 are XORed by the second XOR gate 112 to generate descrambled signal 116. The descrambled signal 116 is identical to the source signal 104.

Figure 4:
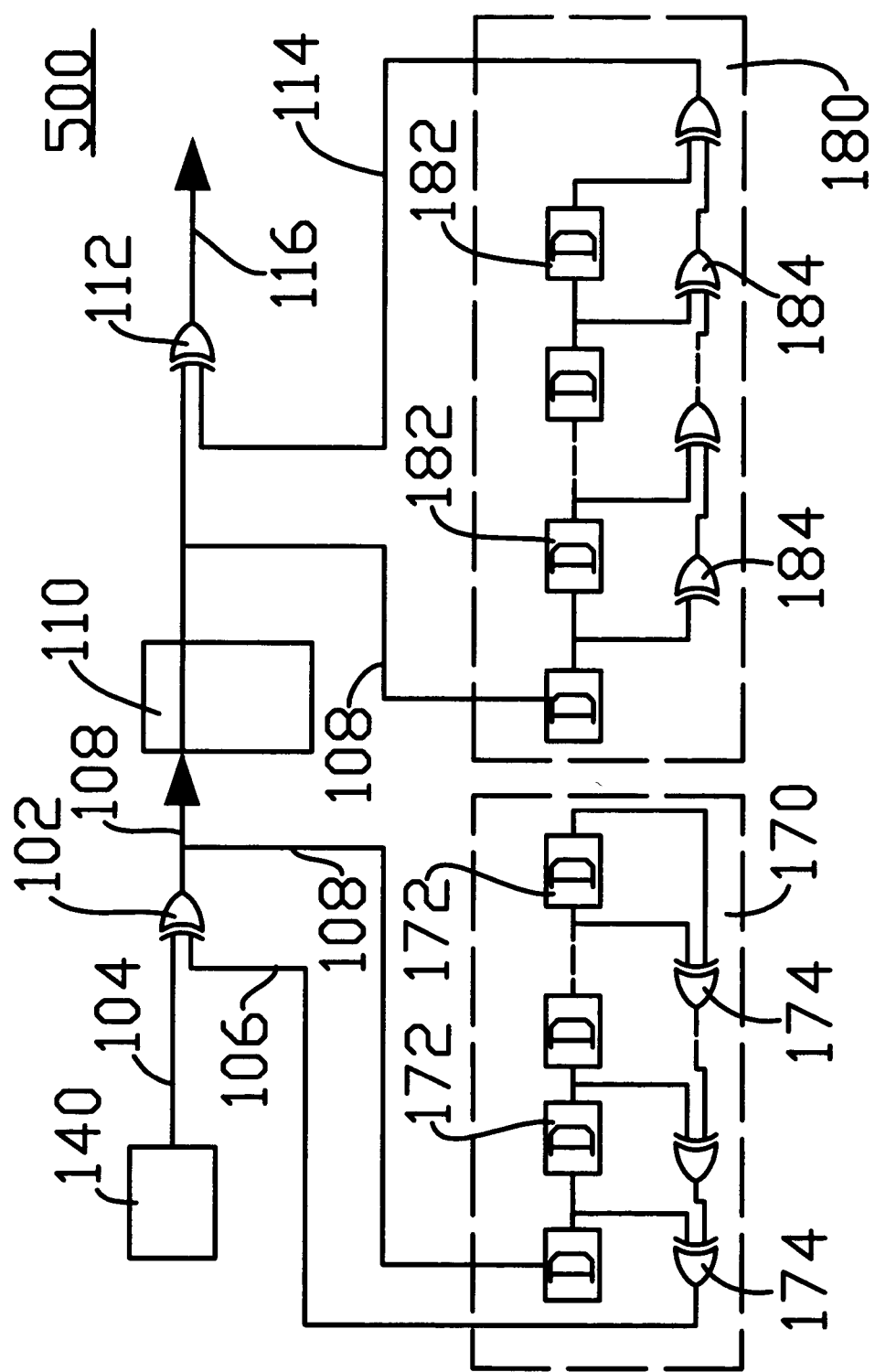

FIG. 4, in which like elements share like reference numbers with FIG. 1, shows a block diagram for a power consumption stabilization system for digital logic circuits. In the power consumption stabilization system 500, the descrambling random signal for use in unscrambling the scrambled signal is encoded in the scrambled signal.

A signal source 140 provides a source signal 104 to a first XOR gate 102. The source signal 104 can be any digital signal, such as a data signal or control signal. A self-synchronizing scrambler 170 provides a scrambling random signal 106 to the first XOR gate 102. The self-synchronizing scrambler 170 uses the scrambled signal 108 as a feedback signal to generate the scrambling random signal 106. The source signal 104 and the scrambling random signal 106 are XORed by the first XOR gate 102 to generate scrambled signal 108. The scrambled signal 108 is transmitted through the digital logic circuit 110. The power consumption of the digital logic circuit 110 is a function of the number of transitions in the signal passing through the digital logic circuit 110.

A self-synchronizing descrambler 180 generates a descrambling random signal 114 using the scrambled signal 108 as a feed-forward signal. The descrambling random signal 114 at the second XOR gate 112 is logically identical to the scrambling random signal 106 used to generate the scrambled signal 108 at the first XOR gate 102. The scrambled signal 108 and the descrambling random signal 114 are provided to a second XOR gate 112. Timing of the descrambling random signal 114 is coordinated with the scrambled signal 108 so that the same bit value of the scrambling random signal 106 that was used to scramble a bit of the source signal 104 is used to unscramble the corresponding bit of the scrambled signal 108. The scrambled signal 108 and the descrambling random signal 114 are XORed by the second XOR gate 112 to generate descrambled signal 116. The descrambled signal 116 is identical to the source signal 104.

The self-synchronizing scrambler 170 includes storage elements 172 and scrambler exclusive OR (XOR) gates 174. The storage elements 172 receive the scrambled signal 108 and each storage element 172 holds one bit. Each scrambler XOR gate 174 XORs one bit of the scrambled signal 108 from one of the storage elements 172 and the output of the scrambler XOR gate 174 immediately upstream. The first scrambler XOR gate 174 is the exception as it XORs two consecutive bits of the scrambled signal 108. The output of the last scrambler XOR gate 174 is the scrambling random signal 106. In one embodiment, 57 bits are used in the self-synchronizing scrambler 170, although a fewer or greater number can be used as desired.

The self-synchronizing descrambler 180 includes storage elements 182 and descrambler exclusive OR (XOR) gates 184. The storage elements 182 receive the scrambled signal 108 and each storage element 182 holds one bit. Each descrambler XOR gate 184 XORs one bit of the scrambled signal 108 from one of the storage elements 182 and the output of the descrambler XOR gate 184 immediately upstream. The first descrambler XOR gate 184 is the exception as it XORs a single bit of the scrambled signal 108, inverting or passing that bit. The output of the last descrambler XOR gate 184 is the descrambling random signal 114. In one embodiment, 57 bits are used in the self-synchronizing descrambler 180, although a fewer or greater number can be used as desired as long as the number of bits is the same as the number used by the self-synchronizing scrambler 170.

Figure 5:
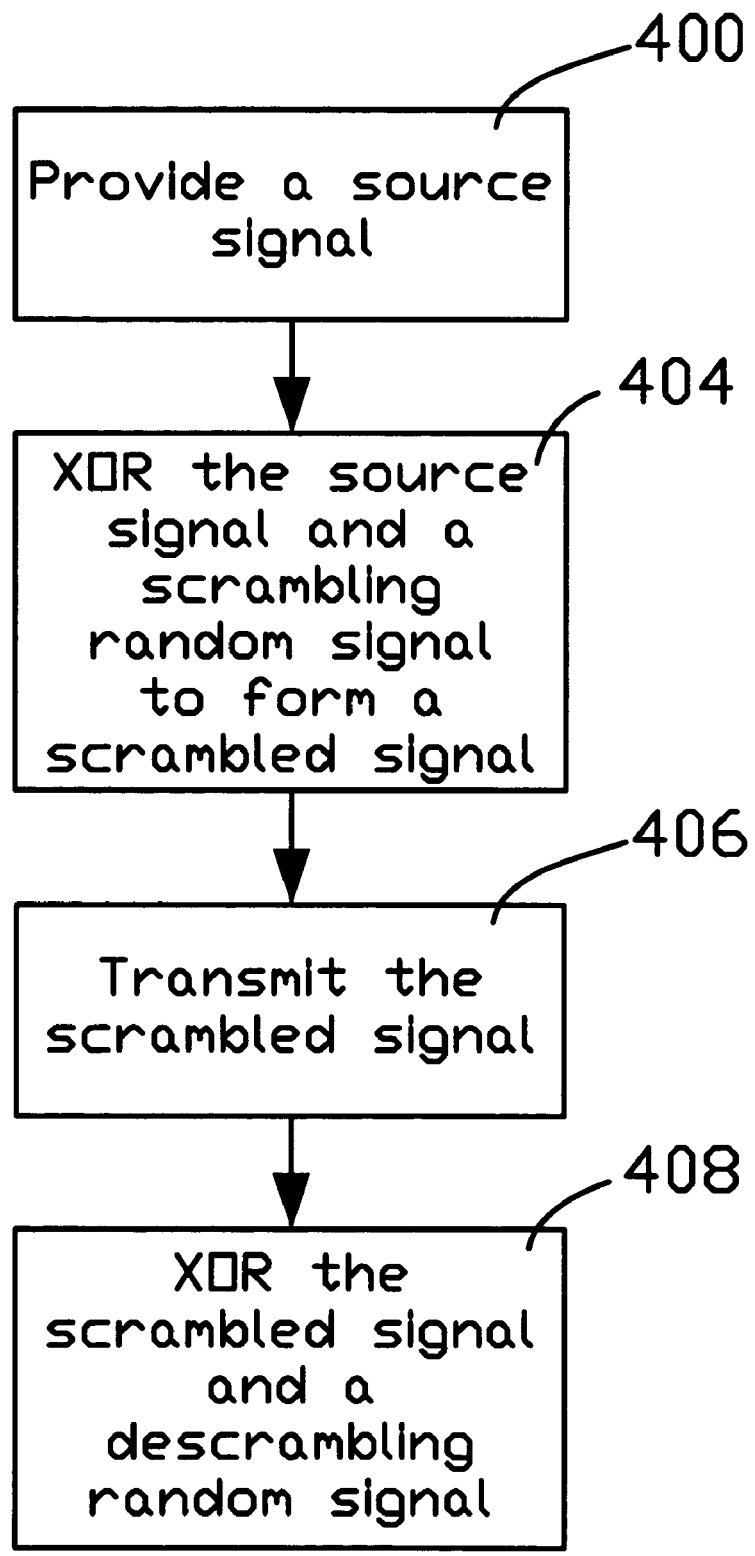
FIG. 5 shows a flow chart of a method for stabilizing power consumption in a digital logic circuit according to the present invention.

FIG. 5 shows a flow chart of a method for stabilizing power consumption in a digital logic circuit. A source signal is scrambled with a scrambling random signal, transmitted through a digital logic circuit, and unscrambled with a descrambling random signal.

A source signal is provided at 400. The source signal can be any digital signal, such as a data signal or control signal. At 404, the source signal and a scrambling random signal are exclusive ORed to generate a scrambled signal, i.e., the scrambled signal is a logic one if either, but not both, of the source signal and the scrambling random signal is logic one. At 406, the scrambled signal is transmitted through the digital logic circuit in which power consumption is a function of the number of transitions in the signal passing through the digital logic circuit. At 408, the scrambled signal and the random signal are exclusive ORed to generate a descrambled signal, which is identical to the source signal.

Timing of the descrambling random signal is coordinated with the scrambled signal so that the same bit value of the random signal that was used to scramble a bit of the source signal is used to unscramble the corresponding bit of the scrambled signal. In one embodiment, the random signal is transmitted through the digital logic circuit with the scrambled signal and re-emerges from the digital logic circuit as the descrambling random signal. In another embodiment, the random signal is a pseudo-random sequence generated by a pseudo-random number generator and the descrambling random signal is the same pseudo-random sequence generated independently by another pseudo-random number generator. In yet another embodiment, the random signal is archived and retrieved as the descrambling random signal.

While the embodiments of the invention disclosed herein are presently considered to be preferred, various changes and modifications can be made without departing from the scope of the invention. For example, the logic gates can comprise any combination of logic gates connected to produce an XOR or XNOR logic operation, and the use of exclusive OR gates include the use of exclusive NOR (XNOR) gates. The scope of the invention is indicated in the appended claims, and all changes that come within the meaning and range of equivalents are intended to be embraced therein.

What is claimed is:

1. A method for stabilizing power consumption in a digital logic circuit, the method comprising:
   providing a source signal;
   XORing the source signal and a scrambling random signal to generate a scrambled signal;
   transmitting the scrambled signal through the digital logic circuit;
   passing the scrambling random signal around the digital logic circuit; and
   XORing the scrambled signal and a descrambling random signal logically identical to the scrambling random signal.

2. The method of claim 1, additionally comprising storing the scrambling random signal.

3. The method of claim 1, additionally comprising:
   generating the scrambling random signal using a first pseudo-random number generator responsive to a reset signal; and
   generating the descrambling random signal using a second pseudo-random number generator responsive to the reset signal.

4. The method of claim 1, additionally comprising:
   generating the scrambling random signal using a self-synchronizing scrambler responsive to the scrambled signal; and
   generating the descrambling random signal using a self-synchronizing descrambler responsive to the scrambled signal.

* * * * *